(12) United States Patent
Matsui

(10) Patent No.: US 6,560,723 B1
(45) Date of Patent: May 6, 2003

(54) AUTOMATIC COMMUNICATION PROTOCOL TEST SYSTEM WITH MESSAGE/SEQUENCE EDIT FUNCTION AND TEST METHOD USING THE SAME

(75) Inventor: Yumi Matsui, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,160

(22) Filed: Dec. 27, 1999

(30) Foreign Application Priority Data

Dec. 28, 1998 (JP) .......................................... 10-374135

(51) Int. Cl.$^7$ ................................................. H02H 3/05
(52) U.S. Cl. ........................................... 714/39; 714/47
(58) Field of Search ............................. 714/39, 40, 43, 714/47, 4; 709/223, 224, 249

(56) References Cited

U.S. PATENT DOCUMENTS

| 5,446,874 | A | * | 8/1995 | Waclawsky et al. ............ 714/1 |
| 5,627,766 | A | * | 5/1997 | Beaven ........................ 370/241 |
| 5,715,394 | A | * | 2/1998 | Jabs ............................ 370/401 |
| 5,732,213 | A | * | 3/1998 | Gessel et al. ................ 370/235 |
| 5,889,954 | A | * | 3/1999 | Gessel et al. ................ 370/467 |
| 6,115,393 | A | * | 9/2000 | Engel et al. ................. 370/469 |

FOREIGN PATENT DOCUMENTS

| JP | 62-38061 | 2/1987 |
| JP | 3-155245 | 7/1991 |
| JP | 4-68844 | 3/1992 |
| JP | 5-316213 | 11/1993 |
| JP | 7-245641 | 9/1995 |
| JP | 10-23107 | 1/1998 |

* cited by examiner

Primary Examiner—Dieu-Minh Le
(74) Attorney, Agent, or Firm—Whitham, Curtis & Christofferson, PC

(57) ABSTRACT

A line monitoring function unit collects message information and sequence information from an existing communication network. A data analyzing function unit converts the collected message information and sequence information into significant information defined for each communication protocol to analyze detailed information on the communication protocol. A scenario creating function unit creates/edits a test scenario and test message with the detailed information obtained by the data analyzing function unit. A data converting function unit converts the data from the scenario creating function unit. A test message input/output function unit executes a communication protocol test in accordance with a sequence of the test scenario obtained from the scenario creating function unit. A log buffer accumulates log information collected during the communication protocol test. An edit searching function unit accesses the scenario creating function unit to obtain a scenario of interest with a search keyword for edit of the information obtained at the scenario creating function unit.

8 Claims, 8 Drawing Sheets

AUTOMATIC COMMUNICATION PROTOCOL TEST SYSTEM WITH MESSAGE/SEQUENCE EDIT FUNCTION AND TEST METHOD USING THE SAME

BACKGROUND OF THE INVENTION

1. Field of the Invention

The present invention relates to an automatic communication protocol test system with a message/sequence edit function for monitoring a communication protocol over a network, creating/editing a scenario for test from collected message information and message operation flow (hereinafter referred to as sequence) information, and performing a communication protocol test as an opposite facility to a facility under test in a communication system in general, and to a test method using the same.

2. Description of the Related Art

Protocols in communication, called communication rules, transmission control procedures or the like, refer to electrical and signal conditions or the like when information is transmitted and received between systems. At present, various protocols have been proposed. If protocols are not correctly implemented in transmitting and receiving information between systems, normal communication services are not ensured. Particularly, in recent years, since communication services provided through communication are more sophisticated and more complicated with an increased variety of parties to be communicated, it becomes difficult to check whether communication protocols are correctly implemented to provide normal services.

Therefore, increasing importance is placed on a protocol test or protocol conformance test for checking whether a communication system correctly implements a protocol such that it can obtain expected communication services with interconnection to another communication system.

Protocol tests, in a broader sense, include protocol validity test for determining whether definitions between systems have no contradiction and intended services can be provided, and in a narrower sense, include a conformance test to specifications for determining whether a protocol is correctly achieved from definition to implementation.

Conventionally, in a protocol test verification system of this kind, message sequences/message data have been manually created. For this reason, as the number of tests is increased including an illegal test or the like, it takes a large number of man-hours to create message sequences/message data.

A prior art communication protocol conformance test apparatuses is described in JP-A-7-245641.

FIG. 1 is a block diagram showing a configuration of a prior art protocol conformance test apparatus. As shown in FIG. 1, the prior art comprises test scenario creating unit 150, test executing unit 160, test result analyzing unit 170, input unit 180, and display unit 190.

Test scenario creating unit 150 includes test sequence editor 151 for describing a test sequence which is the order of test events, i.e. inputs and responses, PDU editor 152 for specifying a test event in a test sequence to set parameters for Nth layer (N)-PDU (Protocol Data Unit), and ASP editor 153 for specifying a test event in a test sequence to set parameters for lower level (N+1)-ASP (Abstract Service Primitive). Test result analyzing unit 170 includes test result sequence analyzer 171 for analyzing mainly a sequence of events out of test results, PDU analyzer 172 for analyzing parameter values for PDU of a test event received at the execution of a test, and ASP analyzer 173 for analyzing parameters for ASP of a test event received at the execution of a test. Three tools of test sequence editor 151, PSU editor 152 and ASP editor 153 are used to create a scenario for use in a conformance test of an OSI (Open Systems Interconnection) reference model.

The operation of the conventional communication protocol conformance test apparatus will be described in brief.

Test scenario creating unit 150 creates a test sequence and test scenario for testing a protocol for a system which implements an arbitrary Nth layer in an OSI reference model. Test executing unit 160 performs a test of a system under test on the basis of the created test scenario. After the test is completed, the test result is sent to test result analyzing unit 170 which analyzes the test result by comparing it with the test scenario, and stores the test result in a file.

The aforementioned apparatus described in the JP-A-7-245641 creates message sequences/message data with manual inputs. This requires enormous amounts of time to create message sequences/message data as the number of tests is increased including an illegal test or the like. Additionally, the apparatus has a problem that the manual inputs for creating message sequences/message data naturally lead to an increase in erroneous inputs, resulting in inability to execute a test.

A yet further problem is that since an apparatus under test is limited to one employing a protocol for a network layer or upper layers in an OSI reference model, there is no expecting a comprehensive test of a communication protocol for a network possibly appearing in the future, to say nothing of existing various networks.

SUMMARY OF THE INVENTION

The present invention is made in view of the aforementioned problems inherent in the prior art, and it is an object of the present invention to provide an automatic communication protocol test system with a message/sequence edit function capable of automatically creating and editing a test scenario to facilitate creation of a test scenario and test message for allowing a comprehensive test of a network, and to provide a test method using the same.

According to the present invention, there is provided an automatic communication protocol test system having a message/sequence edit function for executing a communication protocol test by monitoring a communication protocol over a network and creating/editing a test scenario for testing the communication protocol from collected information on the communication protocol in a communication system, comprising an interface operating similarly to an existing communication network, a line monitoring function unit for collecting message information and sequence information from the existing communication network, a data analyzing function unit for converting the information collected at the line monitoring function unit into significant information defined for each communication protocol to analyze detailed information on the communication protocol, a scenario creating function unit for creating/editing a test scenario and a test message with the detailed information obtained by the data analyzing function unit, a data converting function unit for converting the data from the scenario creating function unit, a test message input/output function unit for executing a communication protocol test in accordance with a sequence of the test scenario obtained from the scenario creating function unit, an edit searching function unit for accessing the scenario creating function unit, acquiring a scenario to be edited with a search keyword, and editing information acquired at the scenario creating function unit, and a log buffer for accumulating log information collected during the communication protocol test.

The scenario creating function unit may include a sequence information buffer for storing sequence information analyzed at the data analyzing function unit, a message information buffer for storing message information, a scenario buffer for storing a test scenario created and edited from the sequence information and the message information stored in the sequence information buffer and the message information buffer, and a message buffer for storing a test message.

The test message input/output function unit may perform transmission and reception of a message to and from a facility under test in accordance with description of the test scenario created and edited at the scenario creating function unit to execute a communication protocol test.

The data analyzing function unit may allow a tester to arbitrarily set analysis contents and analysis items from the information provided by the line monitoring function unit.

The data analyzing function unit may extract and analyze synchronous data and asynchronous data required for transmitting and receiving data between communication facilities out of the information provided by the line monitoring function unit.

According to the present invention, there is provided a method of test using the aforementioned automatic communication protocol test system having a message/sequence edit function, comprising the steps of monitoring a communication protocol over a network, and creating/editing a test scenario for testing the communication protocol from collected information on the communication protocol to execute a communication protocol test.

With a configuration described above, while the creation of these test sequence flow and test message are all performed by a tester in an existing test system, in the present test system, message information and sequence information are collected from an existing network and a test scenario/test message can be automatically created and edited on the basis of the collected information, thereby making it possible to easily create a test sequence flow and test message. Additionally, the collected message information and sequence information from an existing network allows easy creation of a test sequence flow and test message for any new protocol possibly appearing in the future, to say nothing of any of existing protocols.

In addition, the edit of a test scenario and message on the basis of data over an actual network can minimize a range created with manual intervention. As a result, reliability of test data is improved and a message is transmitted and received in accordance with purposes of a test, thereby allowing a faithful test.

Furthermore, since a wide variety of interfaces are provided, a plurality of opposite facilities under test can be simultaneously simulated, allowing a comprehensive network test.

DETAILED DESCRIPTION OF THE PREFERRED EMBODIMENTS

Next, embodiments of the present invention will be described with reference to the drawings.

Figure 1:
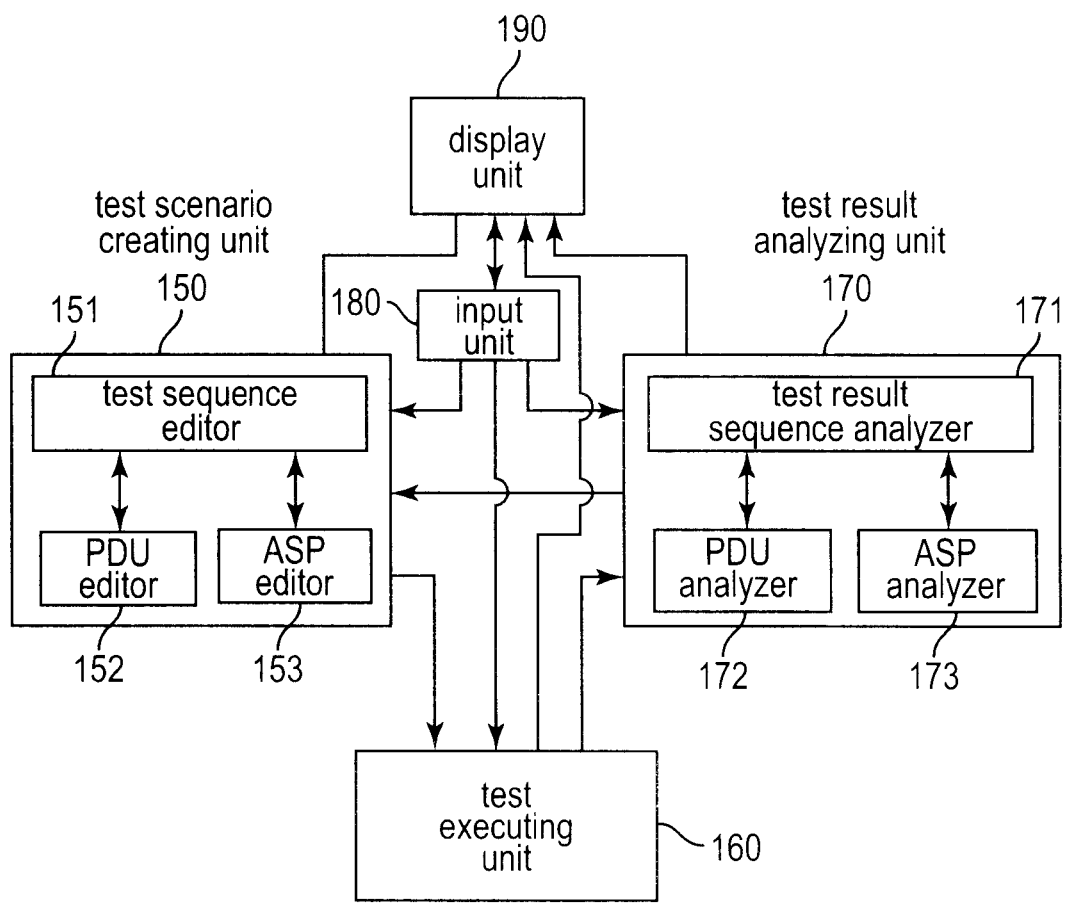
FIG. 1 is a block diagram showing a configuration of a prior art protocol conformance test apparatus.
Figure 2:
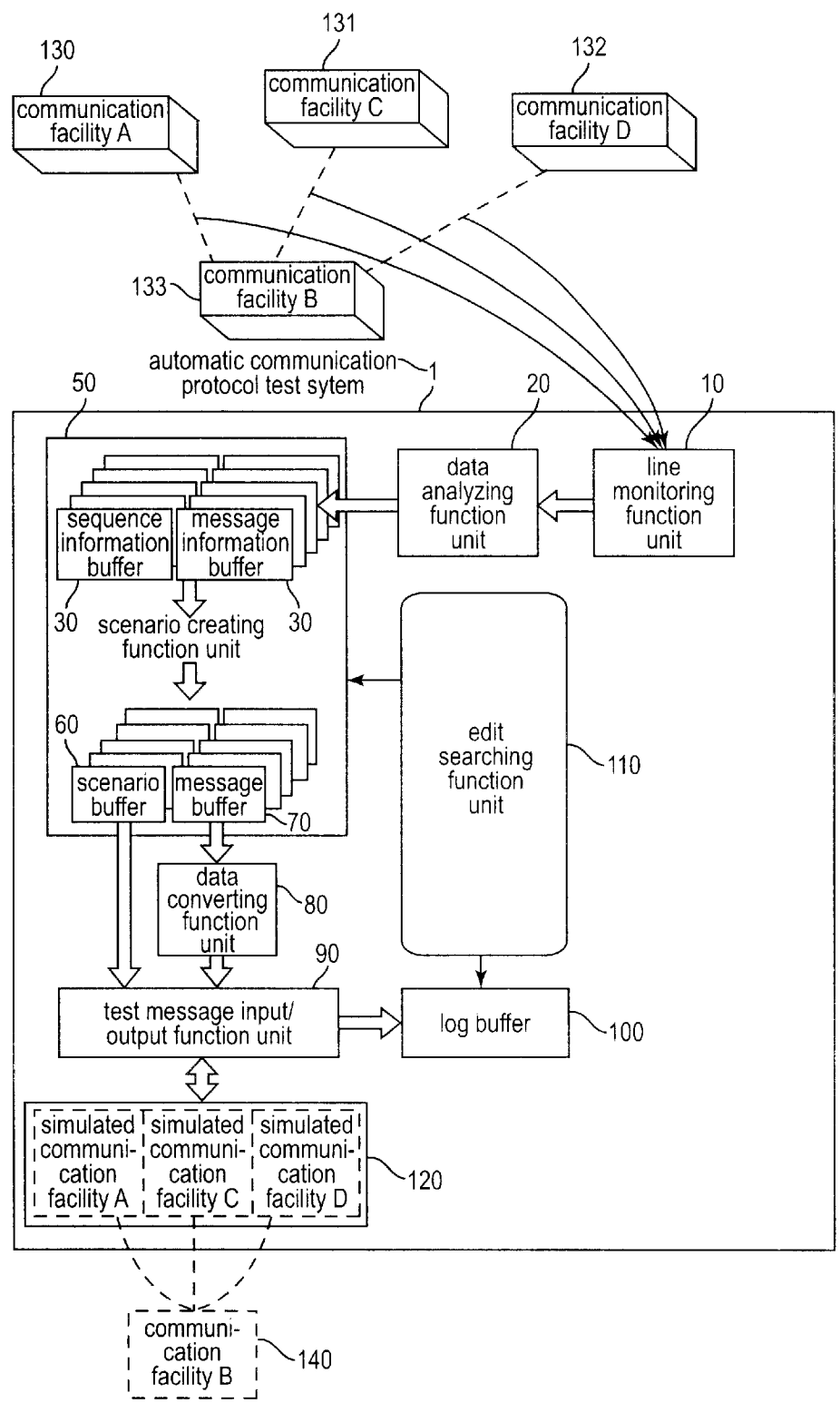
FIG. 2 is a block diagram showing a configuration of a system in a first embodiment of the present invention.

FIG. 2 is a block diagram showing a configuration of a system in a first embodiment of the present invention. As shown in FIG. 2, automatic communication protocol test system 1 of the embodiment comprises line monitoring function unit 10 for collecting message information and sequence information from an existing communication network; data analyzing function unit 20 for converting the collected data into significant information defined for each protocol to analyze detailed information such as message type/operation flow or the like; scenario creating function unit 50 having a function for automatically creating a test scenario and test message on the basis of a previously registered test scenario creating pattern (for each communication facility/each node/each communication layer/specific sequence flow or the like) and a function for allowing a tester to arbitrarily edit/create a test scenario/test message with access from edit searching function unit 110, later described; sequence information buffer 30 and message information buffer 40 in scenario creating function unit 50 each for storing the analysis result in data analyzing function unit 20; edit searching function unit 110 for acquiring a scenario of interest from sequence information buffer 30 with entry of a search keyword to edit contents of a message or operation flow in scenario creating function unit 50; test message input/output function unit 90 responsible for a function for simulating an opposite facility to a facility under test as a communication protocol system and for transmitting and receiving test messages accumulated in message buffer 70 to and from the facility under test via data converting function unit 80 in accordance with sequence description in test scenarios accumulated in scenario buffer 60 to perform a test of a communication protocol; and log buffer 100 for accumulating log information collected during the test.

In FIG. 2, line monitoring function unit 10 collects message information and sequence information transmitted over an existing communication network by monitoring a communication protocol over the network. The collected data is analyzed at data analyzing function unit 20 for detailed information such as an operation flow or message type. The analysis result is stored in message information buffer 40 in scenario creating function unit 50 in terms of the message information, and stored in sequence information buffer 30 in scenario creating function unit 50 in terms of the sequence information.

Scenario creating function unit 50 and search edit function unit 110 have a function for creating a test scenario (a program which describes sequence information for test) and a test message which are required in order for the system, as automatic communication protocol test system 1, to simulate an opposite facility to a facility under test. Edit searching function unit 110 allows search/extraction of sequence information to be edited from sequence information buffer 30 or scenario buffer 60 which accumulates created test scenarios with a search keyword entered by a manipulator from a terminal (not shown) attached to edit searching function unit 110 for edit in scenario creating function unit 50. Each message information required in an edit sequence may be searched/edited from message information buffer 40 or message buffer 70 which accumulates created test messages for edit as required. The created test scenario is stored in scenario buffer 60, while the test message is stored in message buffer 70.

In the above, a message refers to a message itself transmitted and received between systems and to control codes or the like provided before and after the message, while a scenario refers to a described test procedure for a protocol.

Test message input/output function unit 90 has a function for allowing the system as automatic communication protocol test system 1 to simulate an opposite facility to a facility under test. Specifically, test message input/output function unit 90 transmits/receives the test messages accumulated in message buffer 70 via data converting function unit 80 to and from a facility under test in accordance with the sequence description of the test scenarios accumulated in scenario buffer 60 to perform a communication protocol test. Logs during the test are accumulated in log buffer 100.

Figure 3:
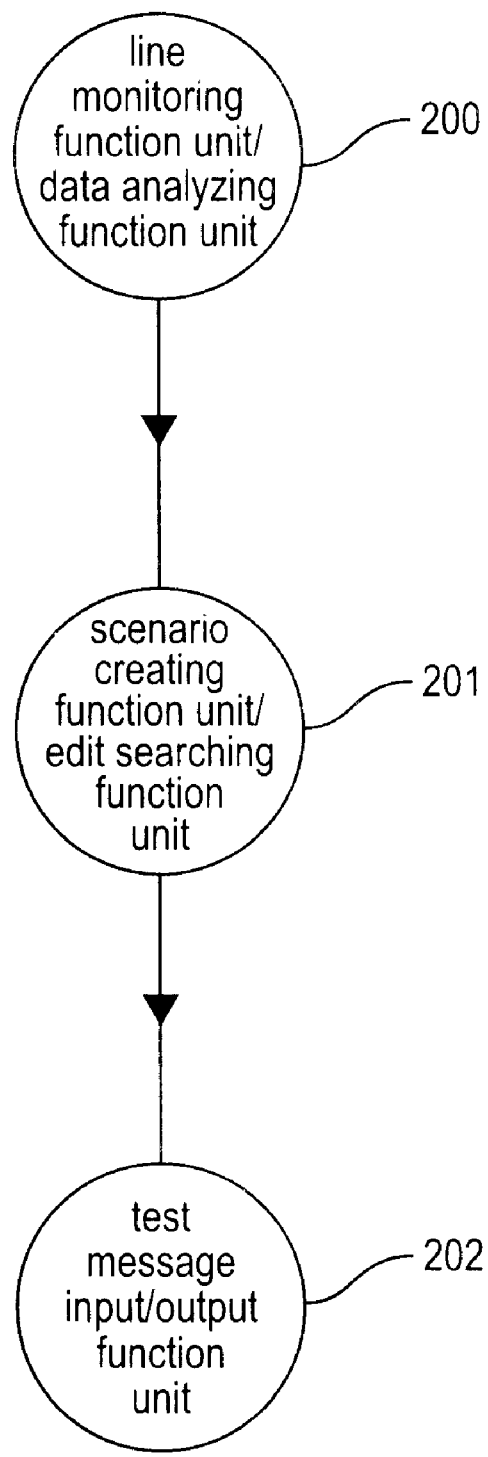
FIG. 3 is a schematic flow chart showing an execution order of a software executed in respective portions of an automatic communication protocol test system of the embodiment.

FIG. 3. is a schematic flow chart showing an execution order of a software executed in respective portions of automatic communication protocol test system 1 of the embodiment. As shown in FIG. 3, the software in the embodiment is executed in the order of line monitoring function unit/data analyzing function unit 10, 20 (S200), scenario creating function unit/edit searching function unit 50, 110 (S201), and test message input/output function unit 90 (S202).

Figure 4:
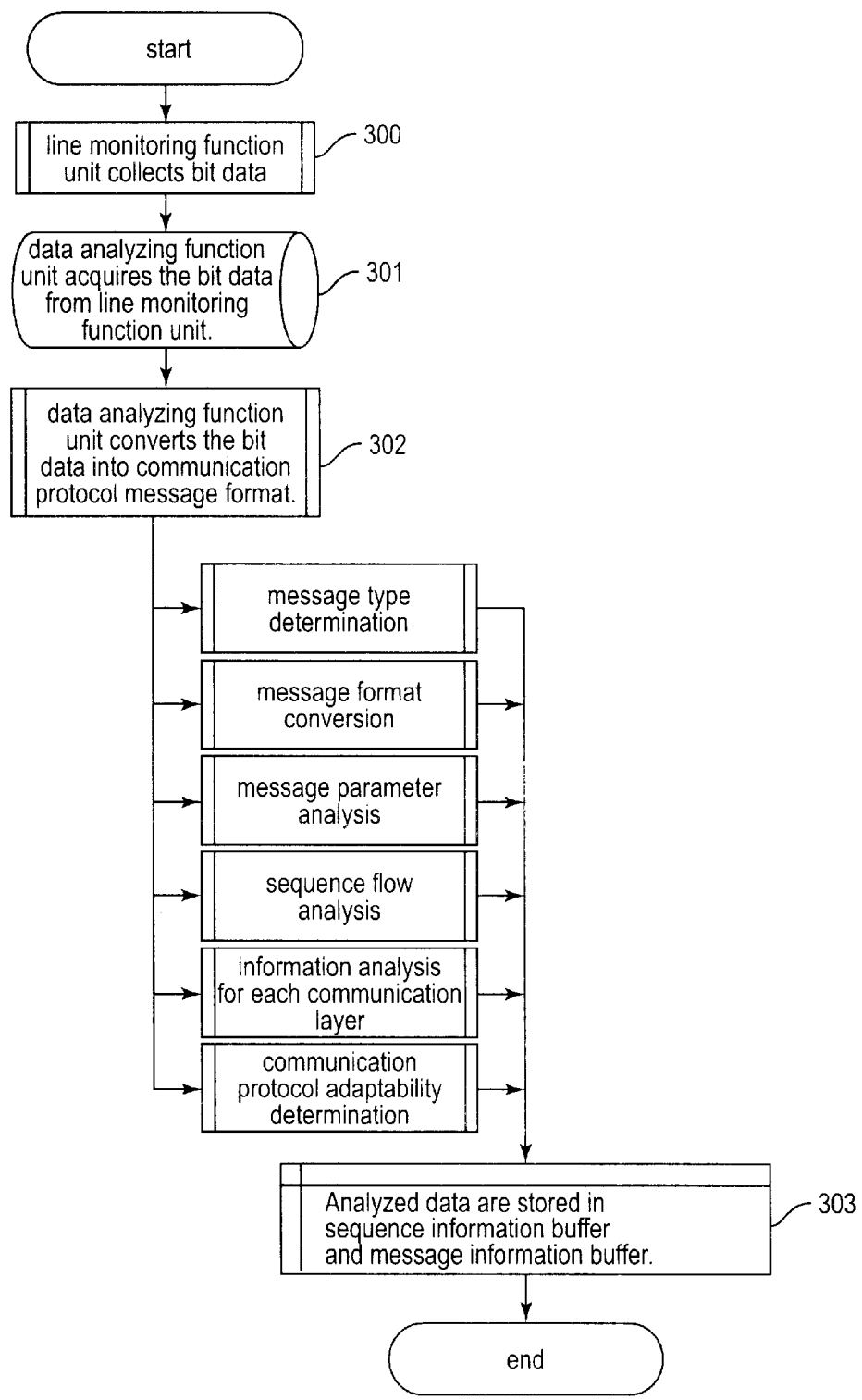
FIG. 4 is a flow chart showing an operation of a line monitoring function unit/data analyzing function unit.

FIG. 4 is a flow chart showing the operation of line monitoring function unit/data analyzing function unit 10, 20. In FIG. 4, double-lines at both ends of a processing step represent a subroutine. These sub routines are invoked from main routines, and after the processing of a sub routines ends, control returns to a main routine to resume processing from the step next to the step invoking the sub routine.

Figure 5:
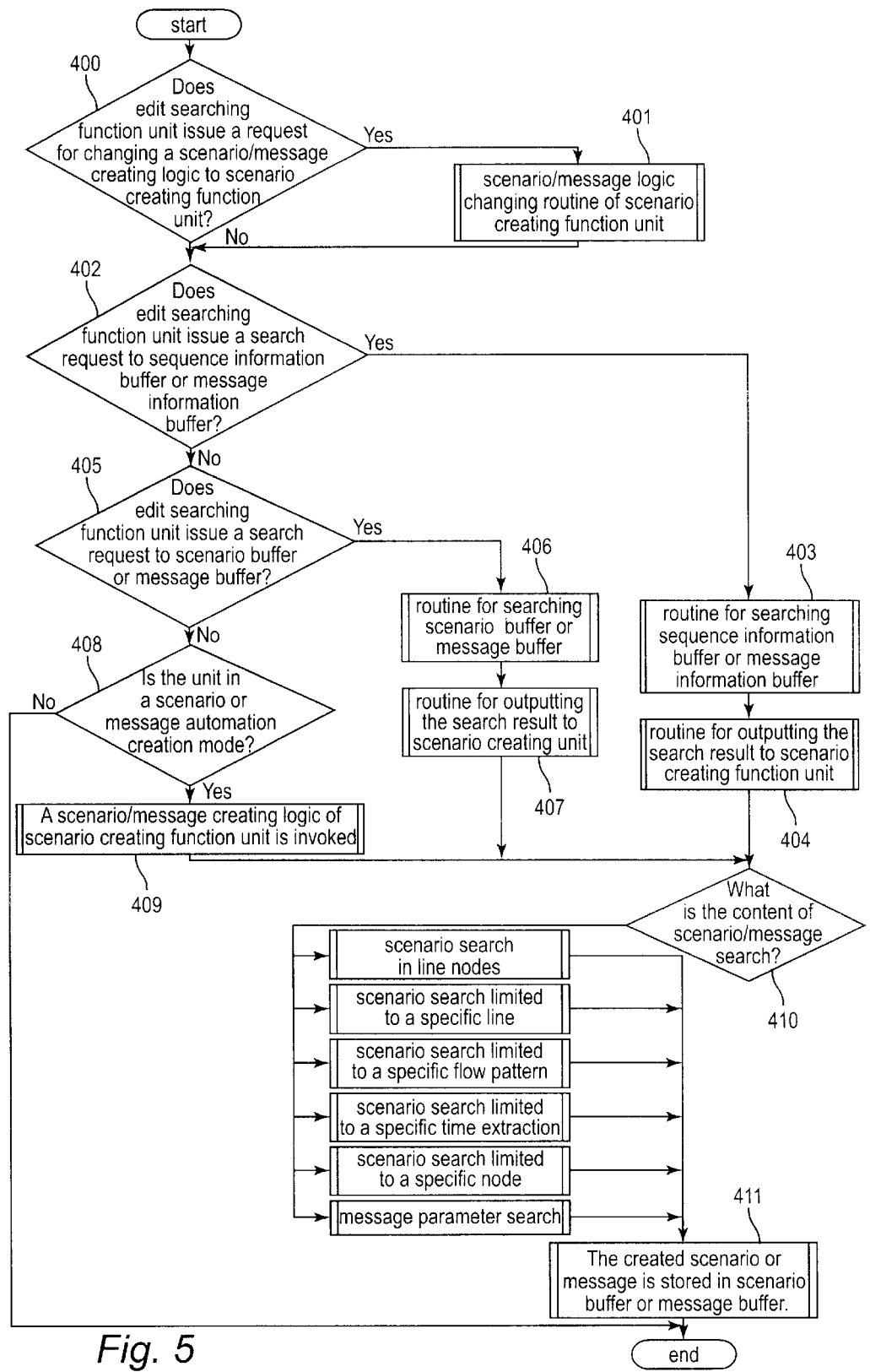
FIG. 5 is a flow chart showing an operation of a scenario creating function unit/edit searching function unit.
Figure 6:
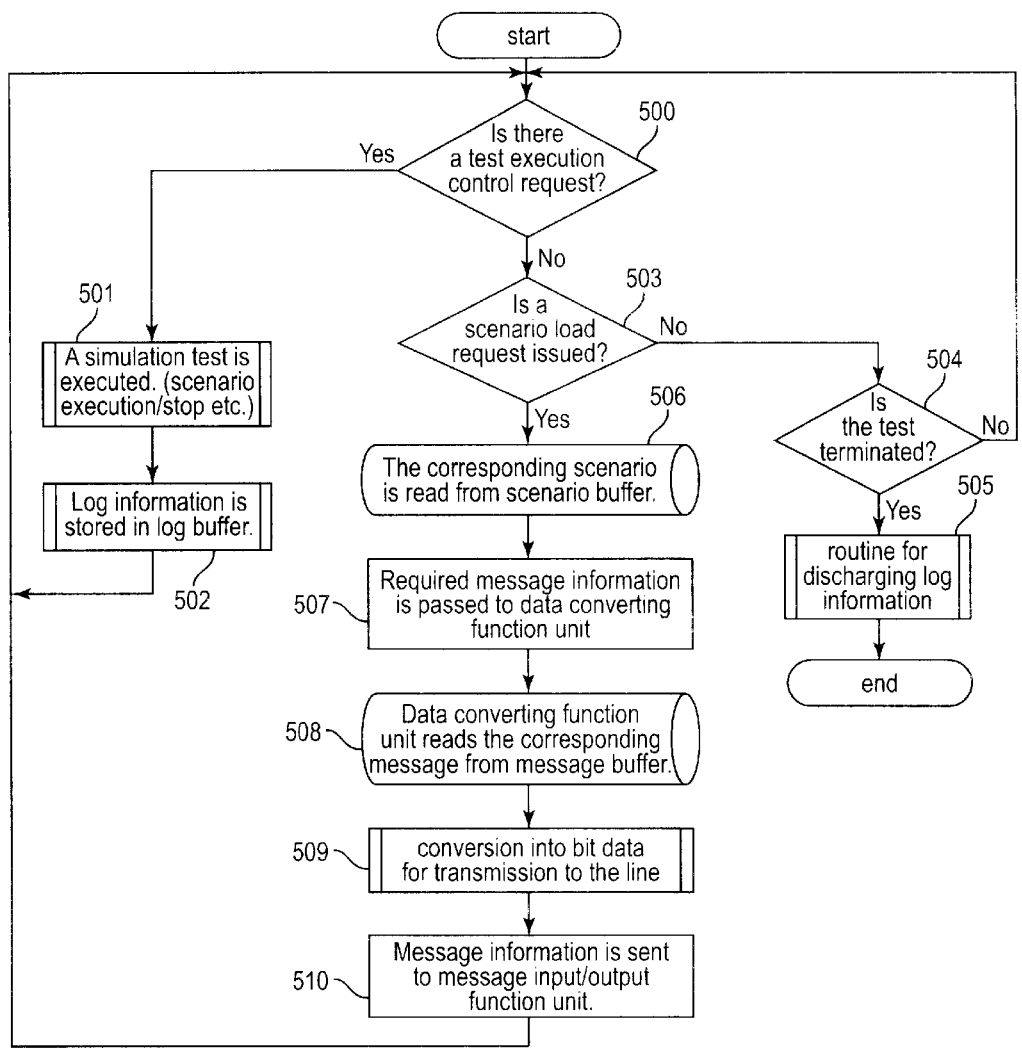
FIG. 6 is a flow chart showing an operation of a test message input/output function unit.

FIG. 5 is a flow chart showing the operation of scenario creating function unit/edit searching function unit 50, 110. FIG. 6 is a flow chart showing the operation of test message input/output function unit 90.

Next, the first embodiment of the present invention will be described with reference to FIG. 4, FIG. 5 and FIG. 6.

First, description is made for a function for acquiring communication information over an existing network at line monitoring function unit 10 and automatically analyzing it at data analyzing function unit 20.

Line monitoring function unit 10 automatically detects a line clock from a communication line to extract transmission data and bit data in a non-communicated state without discrimination on the time-series basis (S300).

Data analyzing function unit 20 acquires the bit data collected at line monitoring function unit 10 on the basis of information defined for each protocol (S301), and converts it into each communication protocol message format (S302). Specifically, at S302, a message ID is analyzed, and from the message ID information, each processing is performed such as message name (type) determination, each message format conversion, message parameter analysis, sequence flow analysis for each line or over a plurality of lines, information analysis for each communication layer, and communication protocol adaptability (true/false) determination. Of the information analyzed at this step, information on sequence is stored in sequence information buffer 30, while information on message is stored in message information buffer 40 (S303).

Net, description will be made for a process of creating a test scenario/test message. Scenario creating function unit 50 has a function for editing and creating a test scenario and test message with edit searching function unit 110 and a function for automatically creating a test scenario and test message only by monitoring an existing communication network with line monitoring function unit 10 on the basis of a previously registered test scenario creating pattern (for each communication facility node/each communication layer/specific sequence flow or the like).

The former function is for creating a test scenario and test message by accessing sequence information buffer 30 and message information buffer 40 from edit searching function unit 110, searching information to be edited, and processing it. Additionally, a created scenario may be read from scenario buffer 60 for edit, or a created message may be read from message buffer 70 for edit (changing parameter values or the like).

The created test scenario and test message are stored in test scenario buffer 60 and message buffer 70, respectively.

The latter function is for automatically creating a test scenario and test message which are stored in scenario buffer 60 and message buffer 70, respectively, only by monitoring an existing line provided that a creating logic such as a scenario form to be automatically created (for each line node/each specific communication layer/specific sequence extraction/timeseries nodes) is registered in advance.

Next, description will be made for the operation of scenario creating function unit 50/edit searching function unit 110 including the aforementioned two functions in accordance with the flow chart in FIG. 5.

A check is made to determine whether edit searching function unit 110 issues a request for changing a scenario/message creating logic to scenario creating function unit 50 (S400). If a change request is issued, a scenario/message logic changing routine of scenario crating function unit 50 is invoked (S401).

At S400, if a request is not issued for changing a scenario/message creating logic, a check is made to determine whether edit searching function unit 110 issues a search request to sequence information buffer 30 or message information buffer 40 (S402). If a search request is issued, a routine for searching sequence information buffer 30 or message information buffer 40 is invoked (S403), a routine for outputting the search result to scenario creating function unit 50 is invoked (S404), and control transfers to S410.

At S402, if no search request is issued to sequence information buffer 30 or message information buffer 40, subsequently a check is made to determine whether edit searching function unit 110 issues a search request to scenario buffer 60 or message buffer 70 (S405). If a search request is issued, a routine for searching scenario buffer 60 or message buffer 70 is invoked (S406), a routine for outputting the search result to scenario creating unit 50 is invoked (S407), and control transfers to S410.

At S405, if no search request is issued to scenario buffer 60 or message buffer 70, a check is made to determine whether the unit is in a scenario or message automatic creation mode (S408). If in an automatic creation mode, a scenario/message creating logic of scenario creating function unit 50 is invoked (S409). If not in the automatic creation mode, control transfers to the next to S411.

Next, the content of scenario/message search is determined (S410). At S410, specifically, respective processing is performed such as scenario search in line nodes, scenario search limited to a specific line, scenario search limited to a specific flow pattern, scenario search limited to a specific time extraction, scenario search limited to a specific node, and message parameter search.

Finally, the created scenario or message is stored in scenario buffer 60 or message buffer 70 (S411).

Subsequently, description will be made for a function for performing a simulation test of a communication protocol as a simulated opposite facility to a facility under test.

Test message input/output function unit 90 first acquires a test scenario of interest from scenario buffer 60. Data converting function unit 80 acquires a message of interest from message buffer 70 to convert it into bit data for line transmission. Test message input/output function unit 90 is, as an opposite facility to a facility under test, responsible for a function for controlling a test such as start, stop or the like of a simulation test in addition to transmission and reception of a message in accordance with the description of the test scenario. All log information such as scenario execution result is stored in log buffer 100.

Next, the operation of test message input/output function unit 90 will be described in accordance with the flow chart in FIG. 6.

A check is made to determine whether scenario creating function unit 50 issues a test execution control request (S500). If a test execution control request is issued, a simulation test is executed (S501) and the execution result of the simulation test is stored in log buffer 100 (S501), then control returns to S500.

At S500, if no test execution control request is issued from scenario creating function unit 50, a check is made to determine whether a scenario load request is issued (S503), and if a scenario load request is issued, the corresponding scenario is read from scenario buffer 60 (S506), and then control transfers to S507. If no scenario load request is issued, then a check is made to determine whether the test is terminated (S504), and if terminated, a routine for discharging log information is invoked (S505), then the processing is terminated.

Next, required message information is passed to data converting function unit 80 (S507). Subsequently, data converting function unit 80 reads the corresponding message from message buffer 70 (S508), and converts it into bit data for transmission to the line (S509). After the conversion into bit data, message information is sent to message input/output function unit 90 (S510), and control returns to S500 to continue the processing.

As described above, according to the present embodiment, it is possible to easily implement enormous amounts of and complicated scenarios for test such as an illegal test, fault test or the like and to faithfully realize the transmission of a message suitable for purposes of a test.

Figure 7:
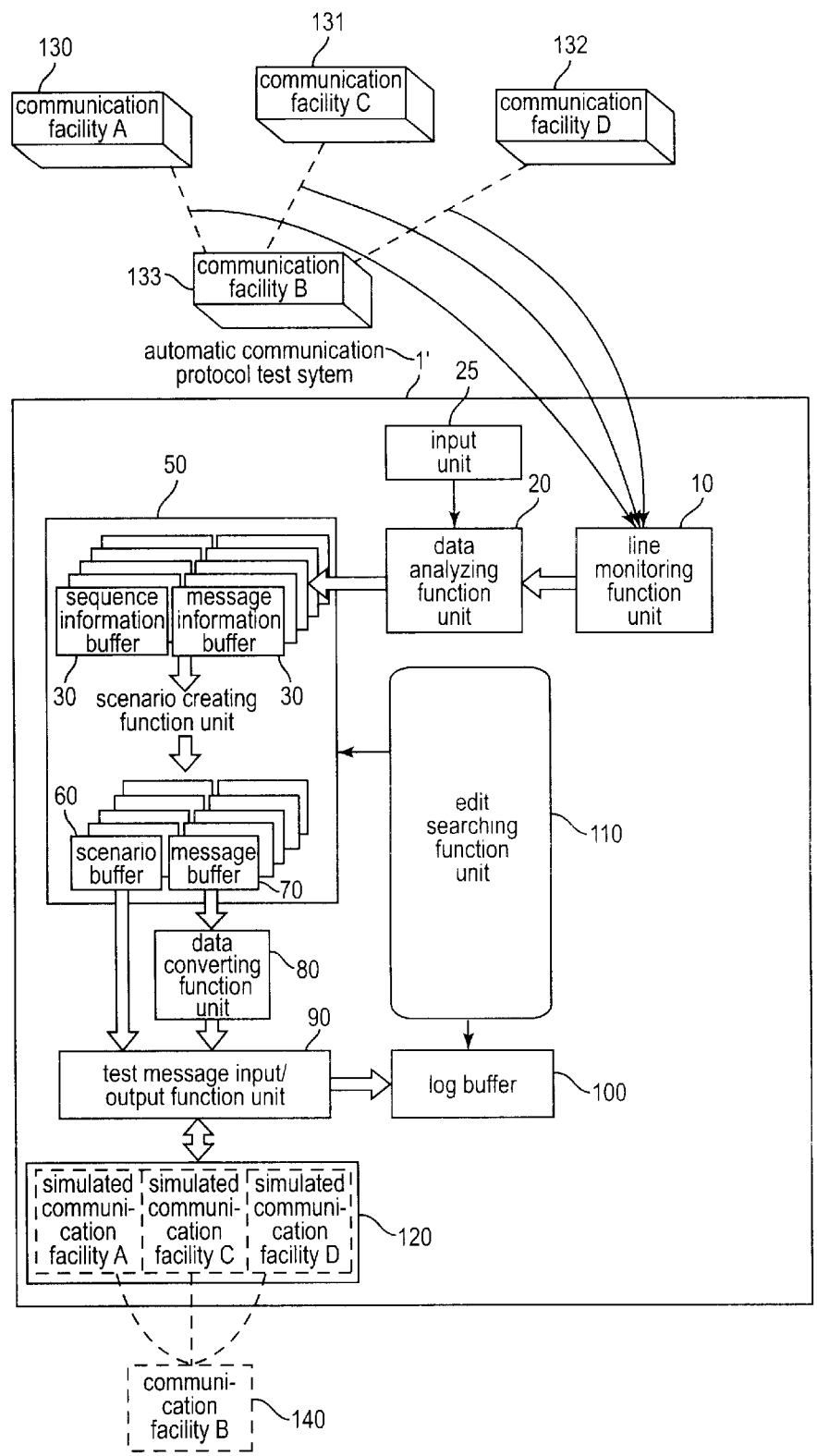
FIG. 7 is a block diagram showing a configuration of a system in a second embodiment of the present invention.

FIG. 7 is a block diagram showing a configuration of a system in a second embodiment of the present invention.

The embodiment is an example in which input unit 25 is provided for specifying required analysis items and analysis contents to data analyzing function unit 20.

Since components other than that described above in the present embodiment are similar to those in the first embodiment shown in FIG. 2, they are designated reference numerals identical to those in FIG. 2.

As shown in FIG. 7, while all message information and sequence information monitored at line monitoring function unit 10 are analyzed at data analyzing function unit 20 in the first embodiment, in the present embodiment, analysis contents and analysis items at data analyzing function unit 20 can be arbitrarily set by a user, thereby rapidly analyzing only necessary information out of large amounts of information collected at line monitoring function unit 10.

Since operations of components other than input unit 25 are similar to those in the first embodiment, description of a detailed operation of automatic communication protocol test system 1' is omitted.

As described above, according to the present embodiment, the provision of input unit 25 enables rapid analysis of only necessary information out of enormous amounts of information collected at data analyzing function unit 20, allowing a reduction in time taken for data analysis.

It should be noted that while input unit 25 is provided for allowing a user to arbitrarily set analysis contents and analysis items in the above, setting data may be read from a program or from a data file into a program for setting instead.

Figure 8:
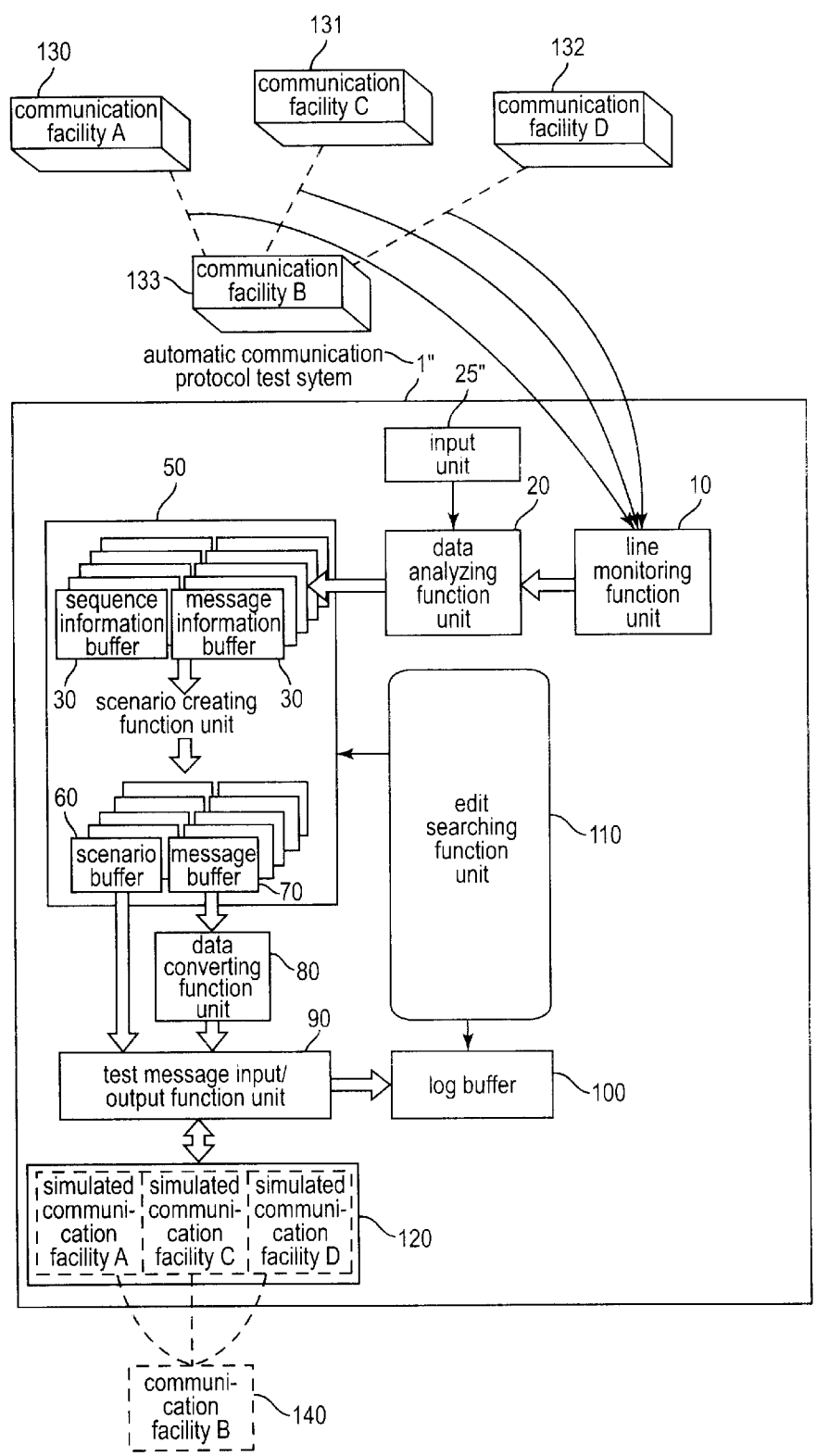
FIG. 8 is a block diagram showing a configuration of a system in a third embodiment of the present invention.

FIG. 8 is a block diagram showing a configuration of a system of a third embodiment of the present invention.

As shown in FIG. 8, the third embodiment is an example in which input unit 25" is provided for specifying extraction of synchronous data/asynchronous data to data analyzing function unit 20 for even faster data analyzing speed in the second embodiment.

Since components other than that described above in the embodiment are similar to those in the first embodiment shown in FIG. 2, they are designated reference numerals identical to those in FIG. 2.

Synchronous data/asynchronous data is analyzed from transmission data detected at line monitoring function unit 10 to allow determination of each communication protocol type. Since synchronous data/asynchronous data is unique to each communication protocol and usually added to the top of a message, it is possible to specify a communication protocol in line nodes from the analysis result thereof. This eliminates the need of communication protocol information which must be set in advance by a user for line monitoring function unit 10, and a communication protocol type can be detected from the extracted bit data and conversion into a message format is possible at data analyzing function unit 20.

As described above, according to the embodiment, a communication protocol can be specified in line nodes. This enables fully automatic detection of a communication protocol type from the extracted bit data on the basis of synchronous data/asynchronous data and conversion into a message format at data analyzing function unit 20.

As described above, according to the present invention, remarkable effects are obtained as follows: (1) In an existing test system, the creation of these test sequence flow and test message are all performed by a tester. However, in the present test system, message information and sequence information are collected from an existing network and a test scenario/test message can be automatically created and edited on the basis of the collected information, thereby making it possible to easily create a test sequence flow and test message. (2) A faithful test is possible. The edit of a test scenario and message on the basis of data over an actual network can minimize a range created with manual intervention. As a result, reliability of test data is improved and a message is transmitted and received in accordance with purposes of a test, thereby allowing a faithful test. (3) Since a wide variety of interfaces are provided, a plurality of opposite facilities under test can be simultaneously simulated, allowing a comprehensive network test.

What is claimed is:

1. An automatic communication protocol test system having a message/sequence edit function for executing a communication protocol test by monitoring a communication protocol over a network and creating/editing a test scenario for testing said communication protocol from collected information on the communication protocol in a communication system, said system comprising:

an interface operating similarly to an existing communication network;

a line monitoring function unit for collecting message information and sequence information from the existing communication network;

a data analyzing function unit for analyzing the information collected at said line monitoring function unit by converting it into significant information defined for each communication protocol to obtain detailed information on the communication protocol;

a scenario creating function unit for creating/editing a test scenario and a test message with the detailed information obtained by said data analyzing function unit;

a data converting function unit for converting the data from said scenario creating function unit;

a test message input/output function unit for executing a communication protocol test with said interface in accordance with a sequence of the test scenario obtained from said scenario creating function unit to verify the content thereof; and a log buffer for accumulating log information collected during the communication protocol test.

2. The automatic communication protocol test system having a message/sequence edit function according to claim 1, further comprising an edit searching function unit for accessing said scenario creating function unit, acquiring a scenario to be edited with a search keyword, and editing information acquired at said scenario creating function unit.

3. The automatic communication protocol test system having a message/sequence edit function according to claim 1, wherein said scenario creating function unit comprises:

a sequence information buffer for storing sequence information analyzed at said data analyzing function unit;

a message information buffer for storing message information;

a scenario buffer for storing a test scenario created and edited from the sequence information and the message information stored in said sequence information buffer and said message information buffer; and a message buffer for storing a test message.

4. The automatic communication protocol test system having a message/sequence edit function according to claim 1, wherein said test message input/output function unit performs transmission and reception of a message to and from a facility under test in accordance with description of the test scenario created and edited at said scenario creating function unit to execute a communication protocol test.

5. The automatic communication protocol test system having a message/sequence edit function according to claim 1, wherein said data analyzing function unit allows a tester to arbitrarily set analysis contents and analysis items from the information provided by said line monitoring function unit.

6. The automatic communication protocol test system having a message/sequence edit function according to claim 1, wherein said data analyzing function unit extracts and analyzes synchronous data and asynchronous data required for transmitting and receiving data between communication facilities out of the information provided by said line monitoring function unit.

7. The automatic communication protocol test system having a message/sequence edit function according to claim 5, wherein said data analyzing function unit extracts and analyzes synchronous data and asynchronous data required for transmitting and receiving data between communication facilities out of the information provided by said line monitoring function unit.

8. A method of test using the automatic communication protocol test system having a message/sequence edit function according to claim 1, comprising the steps of:

monitoring a communication protocol over a network; and creating/editing a test scenario for testing said communication protocol from collected information on the communication protocol to execute a communication protocol test.

* * * * *